US007731303B1

(12) United States Patent
Ring et al.

(10) Patent No.: US 7,731,303 B1
(45) Date of Patent: Jun. 8, 2010

(54) PUSH BUTTON TWO SIDE OPERATION HAND BRAKE RELEASE

(76) Inventors: Michael E. Ring, 8640 Fairbanks St., Crown Point, IN (US) 46307; Ronald Henry, 500 Decatur Dr., Salem, VA (US) 24153

( * ) Notice: Subject to any disclaimer, the term of this patent is extended or adjusted under 35 U.S.C. 154(b) by 1802 days.

(21) Appl. No.: 09/664,190

(22) Filed: Sep. 18, 2000

(51) Int. Cl.
*B60T 15/16* (2006.01)
*B60T 17/00* (2006.01)

(52) U.S. Cl. ............................ 303/13; 303/3; 303/128; 188/33; 188/107

(58) Field of Classification Search ..................... 303/3, 303/5, 2, 7, 8, 9, 13–18, 33, 36, 50, 51, 71, 303/86, 128, 119.1, 119.2, 9.61; 188/33, 188/49–55, 106 P, 106 R, 107, 153 R
See application file for complete search history.

(56) References Cited

U.S. PATENT DOCUMENTS 3,891,277 A * 6/1975 Cope ............................ 303/2
4,368,927 A * 1/1983 Billingsley et al. ............ 303/18
5,549,363 A * 8/1996 Kanjo et al. .................... 303/7
5,738,416 A * 4/1998 Kanjo et al. .................... 303/7
6,394,559 B1 * 5/2002 Ring et al. ..................... 303/13
6,848,754 B2 * 2/2005 Ring et al. ..................... 303/71
7,014,275 B2 * 3/2006 Ring ........................... 303/13

FOREIGN PATENT DOCUMENTS

EP 1193155 A1 * 4/2002

* cited by examiner

*Primary Examiner*—Melody M Burch
(74) *Attorney, Agent, or Firm*—James Ray & Assoc

(57) ABSTRACT

An apparatus to enable the automatic release of a railway vehicle hand brake system from either side of the vehicle comprises a source of fluid pressure engageable with the vehicle. A release cylinder, operable by fluid pressure, is connected to a hand brake mechanism. A valve is connected intermediate the source of fluid pressure and the release cylinder causing the release cylinder to release the hand brake system. A first valve actuator is disposed on a first side of the vehicle and is connected intermediate the valve and the source of fluid pressure. A second valve actuator is disposed on an opposed second side of the vehicle and is connected intermediate the valve and the source of fluid pressure. Both the first and second valve actuators cause the valve to initiate communication of fluid pressure from the source of fluid pressure to the release cylinder.

19 Claims, 2 Drawing Sheets

PUSH BUTTON TWO SIDE OPERATION HAND BRAKE RELEASE

FIELD OF THE INVENTION

The present invention relates, in general to hand brake assemblies for use on railway type vehicles and, more particularly to an apparatus to enable the automatic release of a railway vehicle hand brake system from either side of the vehicle.

BACKGROUND OF THE INVENTION

Prior to the conception and development of the present invention, railway car hand brake mechanisms were well known in the art. They usually include a large, rotatable hand wheel disposed in a vertical plane and mounted on a shaft which, through gear train, can rotate a chain drum to wind up a chain that is secured at its end remote from the chain drum to the brake rigging of the railway car. As the hand wheel is rotated in one direction, the brakes are applied and rotation of the hand wheel shaft in the opposite direction is prevented by a pawl which engages a detent wheel on the hand wheel shaft. The hand wheel is rotated manually and requires an operator to apply a sufficient amount of force thereto.

The brakes may be released by disengaging the pawl from the detent wheel by manually turning the hand wheel in the opposite direction, however this causes rapid rotation of the hand wheel and the gears of the gear train which may cause a hazardous condition. To avoid rapid rotation of the hand wheel, hand brake mechanism have been devised which are known as “quick release” mechanisms. These quick release mechanisms are operated by hand and require an operator to climb onto the train in order to activate them. Generally these quick release mechanisms include a releasable connecting means between the hand wheel shaft and the gear train. When the connecting means is released, the gears of the gear train rotate rapidly without constraint by the pawl and detent wheel, but the hand wheel remains stationary.

As can be seen from the above-discussion, it would be advantageous to have an automatic application apparatus having an automatic release system for releasing the hand brake system and thereby eliminate the need for an operator to climb onto the railway vehicle and manually operate a release device. The automatic application apparatus is the subject of a co-pending application Ser. No. 09/507,227, filed Feb. 18, 2000. This co-pending application is owned by the assignee of the present invention and is incorporated into the present application by reference thereto.

SUMMARY OF THE INVENTION

Briefly, the present invention is directed to an apparatus to enable the automatic release of a railway vehicle hand brake system from either side of the vehicle. The apparatus comprises a source of fluid pressure engageable with the vehicle. A release cylinder, which is operable by fluid pressure, is connected to a hand brake mechanism that is engageable with a brake system disposed on the vehicle. A valve means is connected intermediate the source of fluid pressure and the release cylinder. This valve means causes the release cylinder to release the hand brake system. A first valve actuation means is disposed on a first side of the vehicle and is connected intermediate the valve means and the source of fluid pressure. This first valve actuation means causes the valve means to initiate communication of fluid pressure from the source of fluid pressure to the release cylinder. A second valve actuation means is disposed on an opposed second side of the vehicle and is connected intermediate the valve means and the source of fluid pressure. This second valve actuation means also causes the valve means to initiate communication of fluid pressure from the source of fluid pressure to the release cylinder.

OBJECTS OF THE INVENTION

It is, therefore, a primary object of the invention to provide an apparatus to enable the automatic release of a railway vehicle hand brake system from either side of the vehicle.

Another object is to provide an apparatus which is capable of releasing the hand brake system through the use of a pneumatic actuation valve positioned on either side of the vehicle.

Yet another object is to provide an apparatus which may be used by an operator of basically any physical size or stature.

Yet another object is to provide an apparatus which allows for the release of the hand brake system on a railway vehicle without requiring an operator to climb onto the vehicle to manually release the quick release handle.

In addition to the several objects and advantages of the present invention generally described above, various other objects and advantages of the invention will become much more readily apparent to those persons who are skilled in the relevant art from the following more detailed description, particularly, when such detailed description is taken in conjunction with the attached drawing figures and the claims appended hereto.

DETAILED DESCRIPTION OF THE INVENTION

Figure 1:
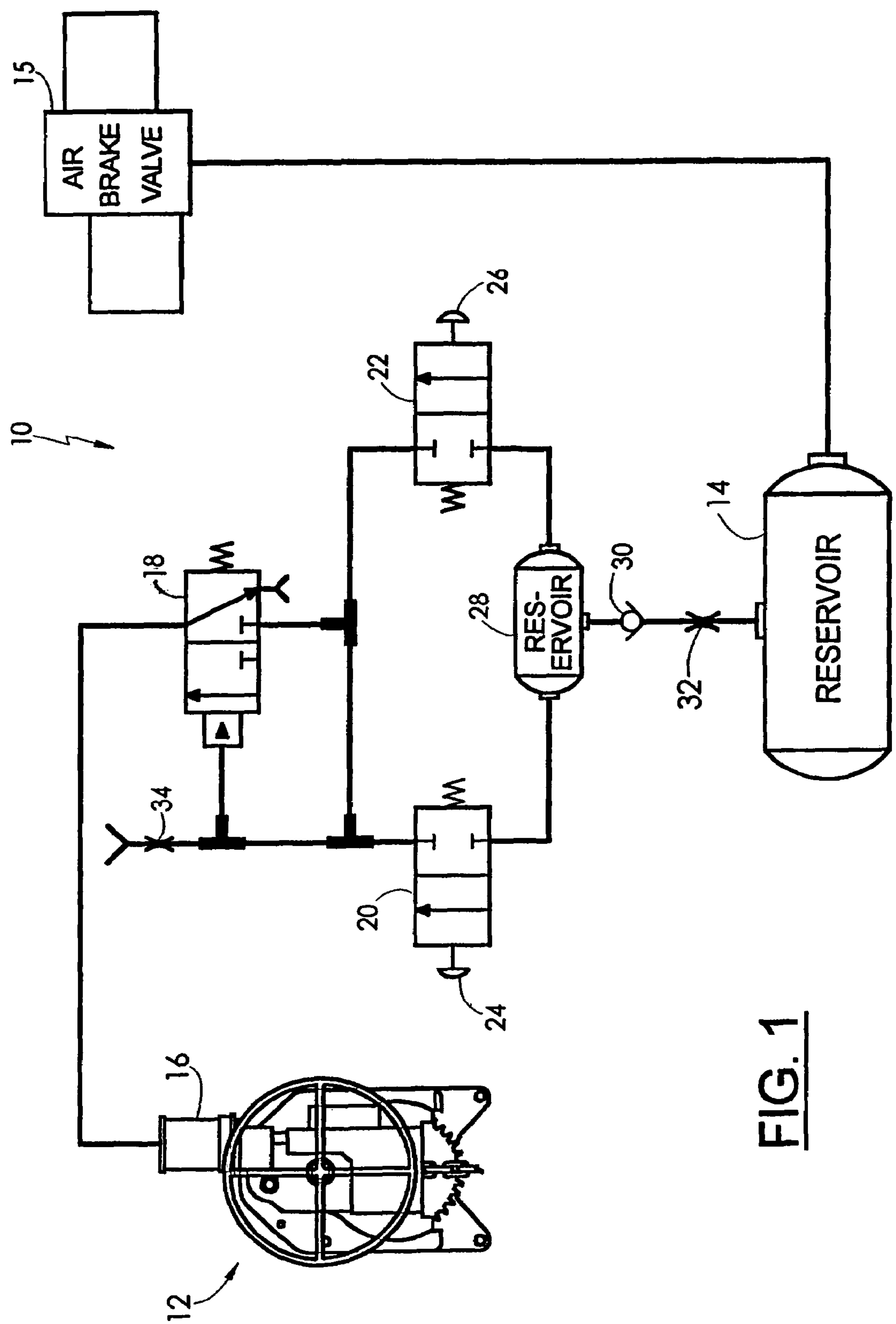
FIG. 1 is a schematic representation of the apparatus of the invention utilizing pneumatically controlled actuation means.

Before describing the invention in detail, the reader is advised that, for the sake of clarity and understanding, identical components having identical functions have been marked where possible with the same reference numerals in each of the Figures provided in this document.

Referring now to FIG. 1, there is shown a schematic representation of an apparatus, generally designated as 10, to enable the automatic release of a railway vehicle hand brake system from either side of the vehicle. The apparatus comprises a source of fluid pressure 14 engageable with the vehicle. The source of fluid pressure has a capacity of approximately 3,000-3,500 cubic inches and is in fluid communication with a brake valve 15, such as an ABDX brake valve.

A release cylinder 16, which is operable by fluid pressure, is connected to a hand brake mechanism, generally designated as 12, that is engageable with a brake system disposed on the vehicle. This hand brake cylinder may be of the type disclosed in co-pending application Ser. No. 09/507,227, filed Feb. 18, 2000, entitled Automatic Application Hand Brake.

A valve means 18 is connected intermediate the source of fluid pressure 14 and the release cylinder 16. This valve means 18 causes the release cylinder 16 to release the hand brake system.

A first valve actuation means 20 is disposed on a first side of the vehicle and is connected intermediate the valve means 18 and the source of fluid pressure 14. This first valve actuation means 20 causes the valve means 18 to initiate communication of fluid pressure from the source of fluid pressure 14 to the release cylinder 16.

A second valve actuation means 22 is disposed on an opposed second side of the vehicle and is connected intermediate the valve means 18 and the source of fluid pressure 14. This second valve actuation means 22 also causes the valve means 18 to initiate communication of fluid pressure from the source of fluid pressure 14 to the release cylinder 16.

The first valve actuation means 20 and second valve actuation means 22 are preferably pneumatic actuators. These actuators may be actuated by means of a push button 24, 26 or any other well known device.

A relatively small reservoir 28 may be optionally connected intermediate the source of fluid pressure 14 and both of the first valve actuation means 20 and the second valve actuation means 22. This relatively small reservoir has a capacity of about 80 cubic inches. A check valve 30 is connected intermediate the source of fluid pressure 14 and this relatively small reservoir 28.

A choke 32, having a diameter of approximately 0.006 inch, is connected intermediate the source of fluid pressure 14 and the check valve 30. A choke 34 is also connected intermediate the valve means 18 and both the first valve actuation means 20 and the second valve actuation means 22 to bleed off any excess fluid to the atmosphere.

Figure 2:
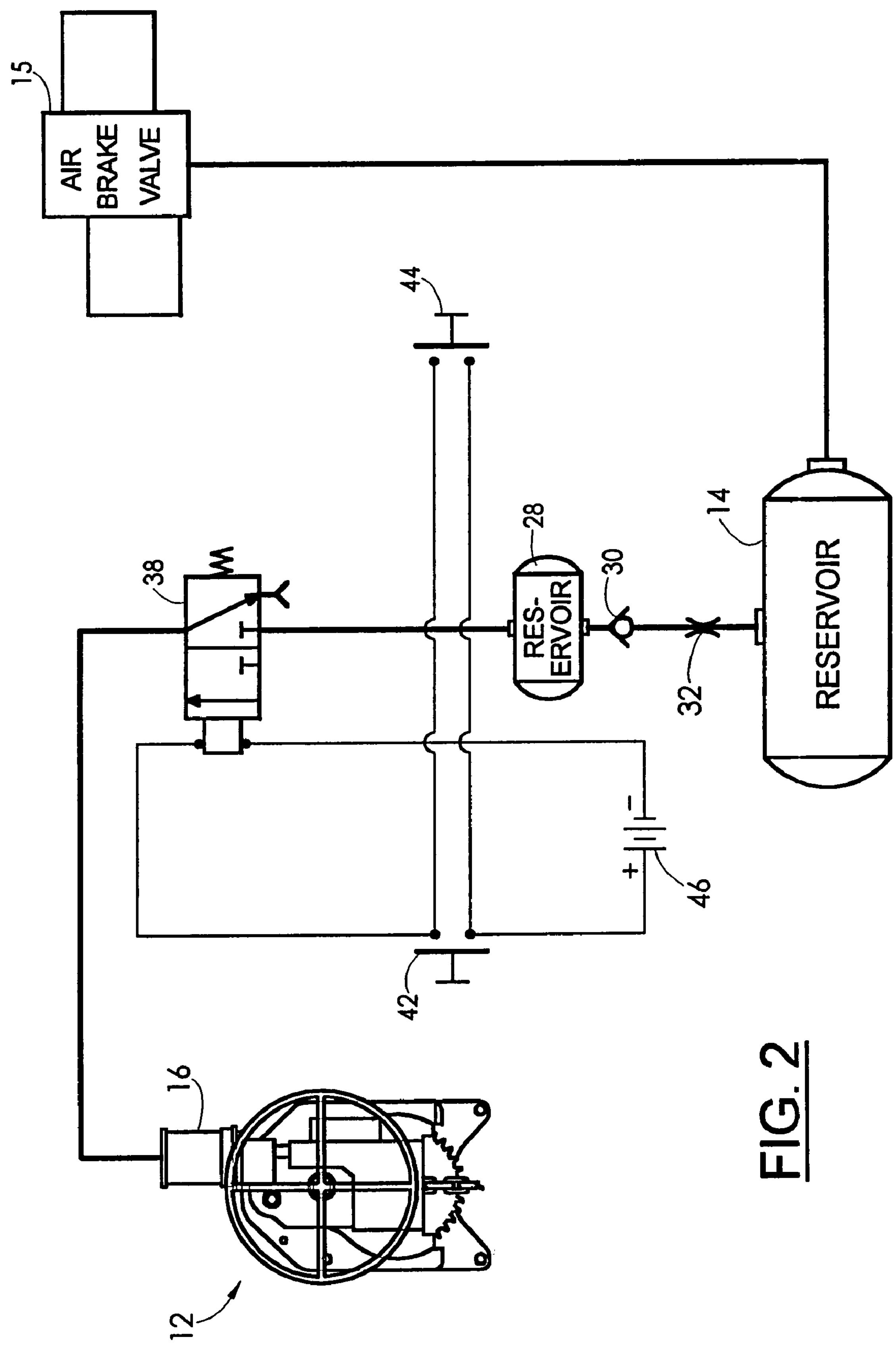
FIG. 2 is a schematic representation of the apparatus of the invention utilizing an electrically controlled actuation means.

According to a second embodiment, as illustrated in FIG. 2, the valve means 38, the first valve actuation means 42 and the second valve actuation means 44 are electronically operated. A power source 46, such as a battery, is provided for operating the valve means 38, the first valve actuation means 42 and the second valve actuation means 44. Although a battery powered source is shown in the drawings, any well known power source may be used to operate the electrically operated valve means 38 and actuation means 42, 44. The first valve actuation means 42 and second valve actuation means comprise electrical switches of a well known type such as mechanical switches, transistor switches, and the like. These switches are electrically controlled. The term electrically controlled, as used in the specification, includes electronic devices, hard wired systems, and wireless systems such as radio control, infrared, microwave, or any other known controlling means.

The FIG. 2 embodiment, as in FIG. 1, includes a relatively small reservoir 28, having a capacity of about 80 cubic inches, which is connected intermediate the valve means 38 and the source of fluid pressure 14. A check valve 30 is connected intermediate the source of fluid pressure 14 and the relatively small reservoir 28.

A choke 32 is connected intermediate the source of fluid pressure 14 and the check valve 30. The choke has a diameter of about 0.006 inch.

The invention has been described in such full, clear, concise and exact terms so as to enable any person skilled in the art to which it pertains to make and use the same. It should be understood that variations, modifications, equivalents and substitutions for components of the specifically described embodiments of the invention may be made by those skilled in the art without departing from the spirit and scope of the invention as set forth in the appended claims. Persons who possess such skill will also recognize that the foregoing description is merely illustrative and not intended to limit any of the ensuing claims to any particular narrow interpretation.

We claim:

1. An apparatus to enable automatic release of a railway vehicle hand brake system from either side of such vehicle, said apparatus comprising:

(a) a source of fluid pressure engageable with such vehicle;

(b) a release cylinder operable by fluid pressure connected to a hand brake mechanism, such hand brake mechanism engageable with a brake system disposed on such vehicle;

(c) a two-position, three-way valve connected intermediate said source of fluid pressure and said release cylinder for causing said release cylinder to release such hand brake system;

(d) a first valve actuator disposed on a first side of such vehicle and connected intermediate said valve and said source of fluid pressure for causing said valve to initiate communication of fluid pressure from said source of fluid pressure to said release cylinder; and (e) a second valve actuator disposed on an opposed second side of such vehicle and connected intermediate said valve and said source of fluid pressure for causing said valve to initiate communication of fluid pressure from said source of fluid pressure to said release cylinder.

2. An apparatus, according to claim 1, wherein said first valve actuator and said second valve actuator are pneumatic actuators.

3. An apparatus, according to claim 2, wherein said apparatus further includes a relatively small reservoir connected intermediate said source of fluid pressure and both said first valve actuator and said second valve actuator.

4. An apparatus, according to claim 3, wherein said apparatus further includes a check valve connected intermediate said source of fluid pressure and said relatively small reservoir.

5. An apparatus, according to claim 4, wherein said apparatus further includes a choke connected intermediate said source of fluid pressure and said check valve.

6. An apparatus, according to claim 4, wherein said relatively small reservoir has a capacity of about 80 cubic inches.

7. An apparatus, according to claim 5, wherein said choke has a diameter of about 0.006 inch.

8. An apparatus, according to claim 2, wherein said apparatus further includes a choke connected intermediate said valve and both said first valve actuator and said second valve actuation means.

9. An apparatus, according to claim 1, wherein said valve and said first valve actuator and said second valve actuator are electrically operated and said apparatus further includes a power source.

10. An apparatus, according to claim 9, wherein said power source is a battery.

11. An apparatus, according to claim 10, wherein said apparatus further includes a relatively small reservoir connected intermediate said valve and said source of fluid pressure.

12. An apparatus, according to claim 11, wherein said apparatus further includes a check valve connected intermediate said source of fluid pressure and said relatively small reservoir.

13. An apparatus, according to claim 12, wherein said apparatus further includes a choke connected intermediate said source of fluid pressure and said check valve.

14. An apparatus, according to claim 13, wherein said relatively small reservoir has a capacity of about 80 cubic inches.

15. An apparatus, according to claim 13, wherein said choke has a diameter of about 0.006 inch.

16. An apparatus, according to claim 9, wherein both said first valve actuator and said second valve actuator are electrical switches.

17. An apparatus, according to claim 1, wherein said source of fluid pressure has a capacity of about 3,500 cubic inches.

18. An apparatus to enable automatic release of a railway vehicle hand brake system from either side of such vehicle, said apparatus comprising:

(a) a source of fluid pressure engageable with such vehicle;

(b) a release cylinder operable by fluid pressure connected to a hand brake mechanism, such hand brake mechanism engageable with a brake system disposed on such vehicle;

(c) a valve connected intermediate said source of fluid pressure and said release cylinder for causing said release cylinder to release such hand brake system;

(d) a first pneumatic actuator disposed on a first side of such vehicle and connected intermediate said valve and said source of fluid pressure for causing said valve to initiate communication of fluid pressure from said source of fluid pressure to said release cylinder; and (e) a second pneumatic actuator disposed on an opposed second side of such vehicle and connected intermediate said valve and said source of fluid pressure for causing said valve to initiate communication of fluid pressure from said source of fluid pressure to said release cylinder.

19. An apparatus to enable automatic release of a railway vehicle hand brake system from either side of such vehicle, said apparatus comprising:

(a) a source of fluid pressure engageable with such vehicle;

(b) a release cylinder operable by fluid pressure connected to a hand brake mechanism, such hand brake mechanism engageable with a brake system disposed on such vehicle;

(c) an electrically operable valve connected intermediate said source of fluid pressure and said release cylinder for causing said release cylinder to release such hand brake system;

(d) an electrically operable first valve actuator disposed on a first side of such vehicle and connected intermediate said valve and said source of fluid pressure for causing said valve to initiate communication of fluid pressure from said source of fluid pressure to said release cylinder;

(e) an electrically operable second valve actuator disposed on an opposed second side of such vehicle and connected intermediate said valve and said source of fluid pressure for causing said valve to initiate communication of fluid pressure from said source of fluid pressure to said release cylinder; and (f) a power source coupled to each of said valve, first valve actuator and second valve actuator.

* * * * *